H. A. WILKINSON.
AUTOMATIC TIRE PUMP.
APPLICATION FILED OCT. 28, 1918.
1,359,214.
Patented Nov. 16, 1920.
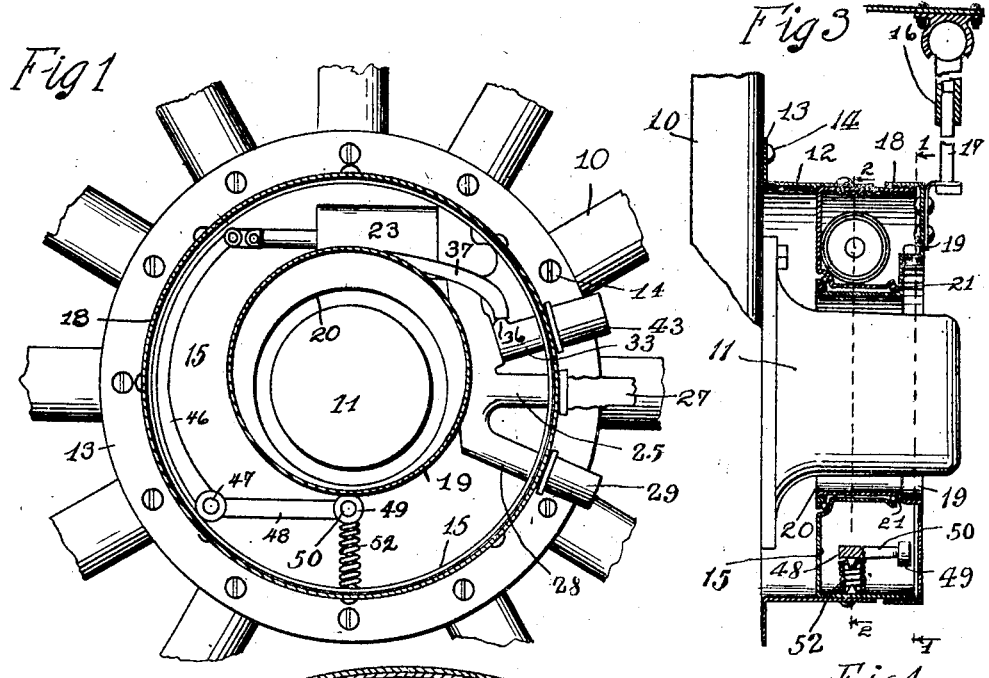
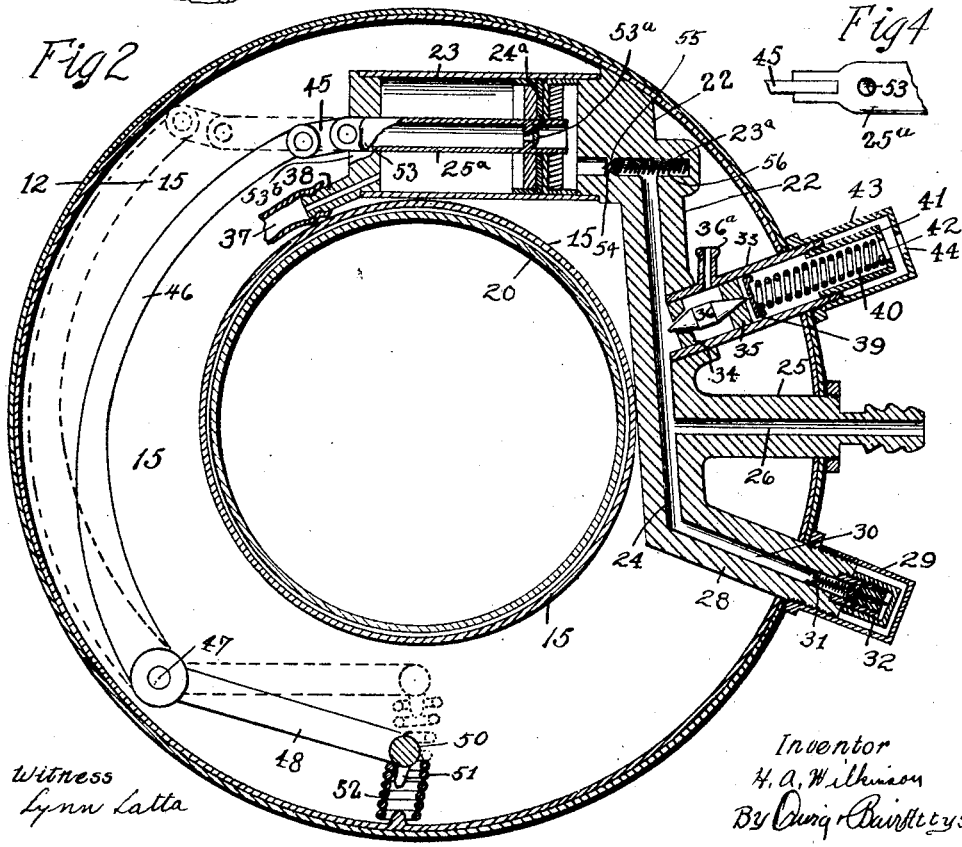
Witness
Lynn Latta
Inventor
H. A. Wilkinson

UNITED STATES PATENT OFFICE.

HERBERT A. WILKINSON, OF DES MOINES, IOWA.

AUTOMATIC TIRE-PUMP.

1,359,214.   Specification of Letters Patent.   Patented Nov. 16, 1920.

Application filed October 28, 1918. Serial No. 260,071.

*To all whom it may concern:*

Be it known that I, HERBERT A. WILKINSON, a citizen of the United States, and a resident of Des Moines, in the county of Polk and State of Iowa, have invented a certain new and useful Automatic Tire-Pump, of which the following is a specification.

The object of my invention is to provide a tire pump adapted to be installed on an automobile wheel for automatically maintaining the air in a pneumatic tire at a predetermined pressure.

More particularly it is my object to provide such a device including a pump with parts so arranged that when the tire pressure is at the proper point, the operated mechanism will be disconnected, and inoperative, whereas when the pressure in the tire is reduced, the mechanism for operating the pump will be actuated for pumping air into the tire.

With these and other objects in view my invention consists in the construction, arrangement and combination of the various parts of the device, whereby the objects contemplated are attained, as hereinafter more fully set forth, pointed out in my claims and illustrated in the accompanying drawings, in which: .

Figure 1 shows a vertical, sectional view through the casing of my improved device installed on a wheel, taken on the line 1—1 of Fig. 3.

Fig. 2 shows an enlarged, vertical, sectional view of my device, taken on the line 2—2 of Fig. 3.

Fig. 3 shows a transverse, sectional view through the device; and

Fig. 4 shows a detail view of one end of the piston rod.

In the accompanying drawings I have used the reference numeral 10 to indicate generally the spokes of a wheel having the hub 11.

My improved device comprises a short cylindrical member 12 having at its inner end a laterally extending flange 13, which is secured to the spokes 10 by screws 14 or any other suitable means.

Secured to the inner surface of the cylinder 12 near the outer edge thereof, is an annular, outwardly opening channel 15, which extends outwardly beyond the cylinder 12.

Suitably mounted on the frame of the automobile by means of a universal joint is a member 16 telescopically connected with a member 17.

Supported by the member 17 is an inwardly opening channel 18. The outer wall of the channel 18 overlaps the outer wall of the channel 15, as illustrated in Fig. 3.

The inner wall of the channel 18 forms a cam 19 as illustrated in Figs. 1 and 3.

Preferably formed on the cam wall 19 is a cylindrical member 20. The member 20 and the inner wall of the channel 15 form coacting portions of a ball race in which race are the balls 21.

It will thus be seen that the channel 15 rotates with the wheel, while the ball race member 20 is held against rotation.

The members 16 and 17 are telescopically connected, so that the member 20 may be held against rotation, and yet allowance may be made for the action of the springs of the car.

Mounted on the inner surface of the outer wall of the channel 15 is a casting or fitting 22, adjacent to one end of which is a pump cylinder 23. In the cylinder 23 is a double piston 24ª with which is connected a hollow piston rod 25ª which extends outwardly through one end of the cylinder.

One end of the cylinder 23 is fitted to the casting 22 and communicates with a passage 23ª therein.

Communicating with the passage 23ª is a passage 24 in the casting 22. The casting 22 has an extension 25 in which is a passage 26 communicating with the passage 24 and designed to be connected by a flexible rubber tube 27 with the interior of the inner tube of a pneumatic tire through the ordinary valve casing, the tire valve of which has been removed.

The fitting 22 has another extension 28 on the outer end of which is a cap 29.

The extension 28 has a passage 30 communicating with the passage 24, and at the outer end of the passage 28 is an ordinary valve 31 similar to the one ordinarily connected with the inner tube.

For covering the stem of the valve 31 there is provided a valve stem cap 32.

After removing the caps 29 and 32 air may be pumped into the tire through the passage 30 in the ordinary way.

I provide a safety valve structure which comprises a cylinder 33 mounted in the wall of the casting 22 and communicating with the passage 24 therein.

In the cylinder 33 are spaced partitions 34 and 35, each having a passage through it and having a valve seat.

A double acting valve 36 is arranged to coact with the respective valve seats in the partitions 34 and 35.

I have shown herein one form of such valve but other forms may be used for accomplishing the purpose.

Communicating with the space between the partitions 34 and 35 is a passage 36ª which is connected by a tube 37 with a passage 38 leading to the interior of the cylinder 23 at the end thereof opposite the passage 23ª.

The valve 36 has a pointed end which projects through the partition 35 and contacts with a disk or plate 39.

In the outer end of the cylinder 33 is a coil spring 40 designed to press against the disk 39. An adjustable cap 41, having a hole 43 in its outer end, is screwed into the cylinder 33, and by adjusting the cap 41 tension of the spring 40 may be regulated.

The cover cap 43 is mounted on the outer end of the cylinder 33 and has an opening 44 in its outer end.

Pivotally connected with the outer end of the rod 25ª is a short link 45. Pivotally connected with the link 45 is a longer curved link 46 which at its end opposite the link 45, is pivoted on a support in the channel 15 at 47.

Operatively connected with the latter described end of the link 46 is a lever 48. At the free end of the lever 48 is a roller 49 carried by a laterally extending arm 50 and arranged to contact with the cam 19 for operating the pump when the air pressure in the tire is below predetermined pressure.

On the free end of the lever 48 is a lug 51 projecting into a coil spring 52. The coil spring 52 is mounted on the wall of the channel 15 and is designed to normally hold the arm 50 in such position as to hold the roller 49 against the cam 19 and to hold the piston 24ª in the opposite end of the cylinder 23 from that shown in Fig. 2.

In the outer end of the hollow piston rod 25ª is an air inlet opening 53. In the piston rod is a flap valve 53ª arranged to coact with a suitable seat and to open when the piston moves toward the left, as illustrated in Fig. 2, and to be closed when the piston moves toward the right, for thereby forcing air through the passage 23ª. A recess 53ᵇ may be provided in the cylinder end to insure free communication between the interior of the piston 25ª and the interior of the channels 15 and 18.

In the passage 23ª is a valve seat 54 with an opening therethrough. A valve 55 is yieldingly held against said seat by means of a spring 56.

I will now describe the practical operation of my improved device.

The parts having been installed, as hereinbefore set forth, and the extension 25 having been connected with the inner tube, by means of the tube 27 which is of flexible material, the tire may be pumped up by removing the caps 29 and 32 and connecting the valve stem casing 28 with a pump.

The valve 55 will prevent any escape of air into the pump cylinder, and the pressure of the spring 40 on the valve 36 will hold the valve 36 seated against the partition 34 till the air in the tire reaches a pressure sufficient to overcome the pressure of the spring 40 and hold the valve 36 seated in its position shown in Fig. 2. When the air has flowed into the tire until the predetermined pressure has been reached, the pump may be disconnected and the members 32 and 29 placed in position, as shown in Fig. 2. The tire may then be used for traveling in the ordinary way.

I shall now describe the automatic operation of the pump 23 when the automobile is moving, or whenever the wheel on which said pump is installed is rotated.

When the pressure in the tire gets below a certain predetermined point, the spring 40 will overcome the air pressure and force the valve 36 toward its position where it seats against the seat 34, whereupon the left hand end of the pump cylinder will be connected with the outside air through the tube 37, the cylinder 33 and the openings 42 and 44. The spring 52 will move the lever 48 for bringing the roller 49 into contact with the cam 19 and will operate the link 46 for moving the piston 24ª to the opposite end of the cylinder from its position shown in Fig. 2, thereby drawing air into the right hand end of the cylinder through the piston 25ª and opening 53.

When the roller is in engagement with the cam it will be seen that the piston will be reciprocated by the cam and the spring 52 for operating the pump and forcing air past the valve 55 into the tire. When the tire reaches the proper predetermined pressure, the valve 36 will be again moved to its position shown in Fig. 2, and the air moving through the tube 37 will hold the piston in its position shown in Fig. 2 and will hold the roller 49 away from the cam. As in this position the left hand end of the cylinder is under the same pressure as the tire, very slight movement of the piston to the left will substantially decrease the pressure relatively in the right hand end, thereby holding the piston from further movement to the left.

My improved device has a number of important advantages which are largely obvious from the foregoing description.

In the first place my device is comparatively simple and inexpensive of construction, and is readily and easily assembled and mounted on automobiles of different kinds and sizes.

On account of the flexibility of the tube 27 the distance between the hub and the tire is not very material.

On account of the telescopical mounting of the members 16 and 17 the distance from the attachment to the frame of the car is not very important, and it follows that it is possible to use practically standard equipment, with all cars having wheels with wooden spokes. For use with wheels with wire spokes it is only necessary to modify the means for attachment to the wheel, and to use any suitable structure for the purpose.

One great advantage of my device, I believe, rests in the structure whereby the main portion of the attachment is mounted on the wheel at the hub, without in any way interfering with the hub or hub cap.

I thus secure a firm support for the device and am able to utilize the rotation of the wheel in a positive manner for operating the pump.

The ball bearings reduce the constant wear and friction of the parts of my device to a minimum, and thereby reduces to a minimum the power necessary for rotating the parts of my device on the wheels.

The arrangement of the parts is such that the operation of the device is automatic and there is no danger of over inflating the tires.

A device of this kind has, of course, the primary advantage of maintaining the pressure in the tires at a predetermined point, thereby resulting in a minimum wear on the tires and avoiding all the dangers due to rim cut and so on. The predetermined pressure may be varied by varying the position of the cap 41 for use with different sizes of tires.

It will be noted that my pump will operate automatically for the rear wheels when the car is running or when one of such wheels is jacked up, and the engine is operated. When the car is stopped and a front wheel is jacked up it may be rotated by hand for operating its pump.

The installation of my device does not in any way interfere with the installation or removal of the tires.

Some changes may be made in the construction and arrangement of the different parts of my improved device without departing from the real spirit and intent of my invention, and it is my intention to cover by my claims any modified forms of structure or use of mechanical equivalents which may be reasonably included within their scope.

I claim as my invention:

1. In a device of the class described, a pump, means for supporting said pump on a wheel, said pump having a cylinder, a piston, and piston rod, a cam, means for supporting said cam against rotation in a certain position with relation to said pump, adjustable means for connecting the piston rod with said cam, a passage communicating with one end of the cylinder, a valve seat therein for closing said passage against the movement of air toward the cylinder, said passage being designed to communicate with a pneumatic tire, a safety valve device comprising a hollow member, a double acting valve therein, said hollow member communicating with the air and with said passage, said double acting valve being adapted in one position to prevent the exit of air from said hollow member to the outside, and in another position to close the passage from said hollow member into said first passage, a tube leading from said hollow member to said pump cylinder on the opposite side of the pump cylinder from the end thereof in communication with said first passage.

2. In a device of the class described, a pump, means for supporting said pump on a wheel, said pump having a cylinder, a piston, a piston rod, a cam, means for supporting said cam against rotation in certain position with relation to said pump, adjustable means for connecting the piston rod with said cam, a passage communicating with one end of the cylinder, a valve seat therein for closing said passage against the movement of air toward the cylinder, said passage being designed to communicate with a pneumatic tire, a safety valve device comprising a hollow member, a double acting valve therein, said hollow member communicating with the air and with said passage, said double acting valve being adapted in one position to prevent the exit of air from said hollow member to the outside, and in another position to close the passage from said hollow member into said first passage, a tube leading from said hollow member to said pump cylinder on the opposite side of the pump cylinder from the end thereof in communication with said first passage, and means for imposing tension on said double acting valve.

3. In a device of the class described, a pump, means for supporting said pump on a wheel, said pump having a cylinder, a piston, a piston rod, a cam, means for supporting said cam against rotation in a certain position with relation to said pump, adjustable means for connecting the piston rod with said cam, a passage communicating with one end of the cylinder, a valve seat therein for closing said passage against the movement of air toward the cylinder, said passage being designed to communicate with a pneumatic tire, a safety valve device comprising a hollow member, a double acting valve therein, said hollow member communicating with the air and with said passage, said double acting valve being adapted in one position to prevent the exit of air from said hollow member to the outside, and in another position to close the passage from said hollow member into said first passage, a tube leading from said hollow member to said pump cylinder on the opposite side of the pump cylinder from the end thereof in communication with said first passage, means for imposing tension on said double acting valve, said means being adjustable.

4. In a device of the class described, a pump, means for supporting said pump on a wheel, said pump having a cylinder, a piston rod, a cam, means for supporting said cam against rotation in a certain position with relation to said pump, adjustable means for connecting the piston rod with said cam, a passage communicating with one end of the cylinder, a valve seat therein for closing said passage against the movement of air toward the cylinder, said passage being designed to communicate with a pneumatic tire, a safety valve device comprising a hollow member, a double acting valve therein, said hollow member communicating with the air and with said passage, said double acting valve being adapted in one position to prevent the exit of air from said hollow member to the outside, and in another position to close the passage from said hollow member into said first passage, a tube leading from said hollow member into said first pump cylinder on the opposite side of the pump cylinder from the end thereof in communication with said first passage, and a valve controlled passage communicating with said first passage and adapted to be connected with a pump.

5. In a device of the class described, the combination of a pump having a piston and a cylinder, with a cam, means for operatively connecting the piston with the cam, said means being movable so that in one position the cam is in inoperative relation to the piston, means for connecting one end of the cylinder with a tire, and means for automatically connecting the other end of the cylinder with a tire when the pressure in the tire is below a certain predetermined point.

HERBERT A. WILKINSON.